May 26, 1959      F. J. WALLACE      2,888,017
ELECTROSURGICAL INSTRUMENT
Filed Sept. 14, 1956
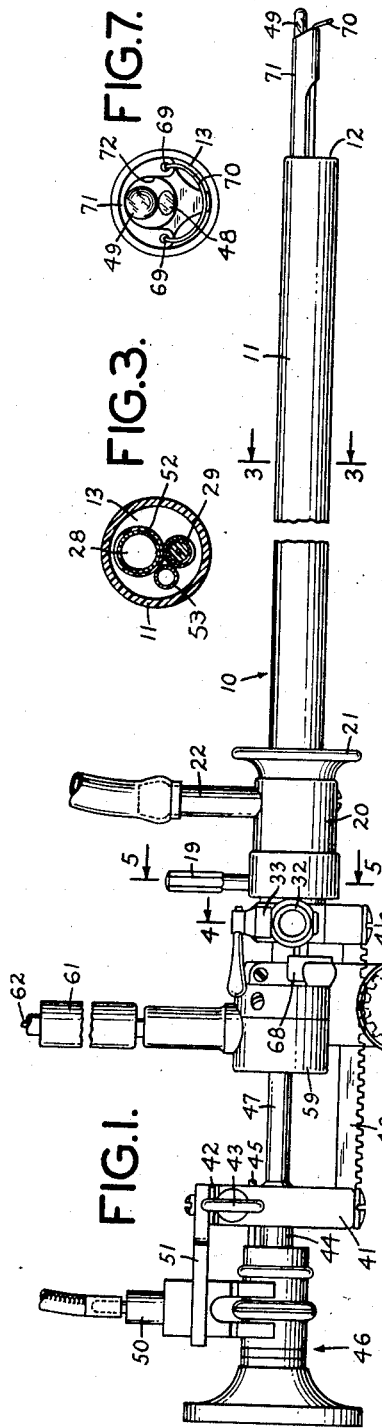
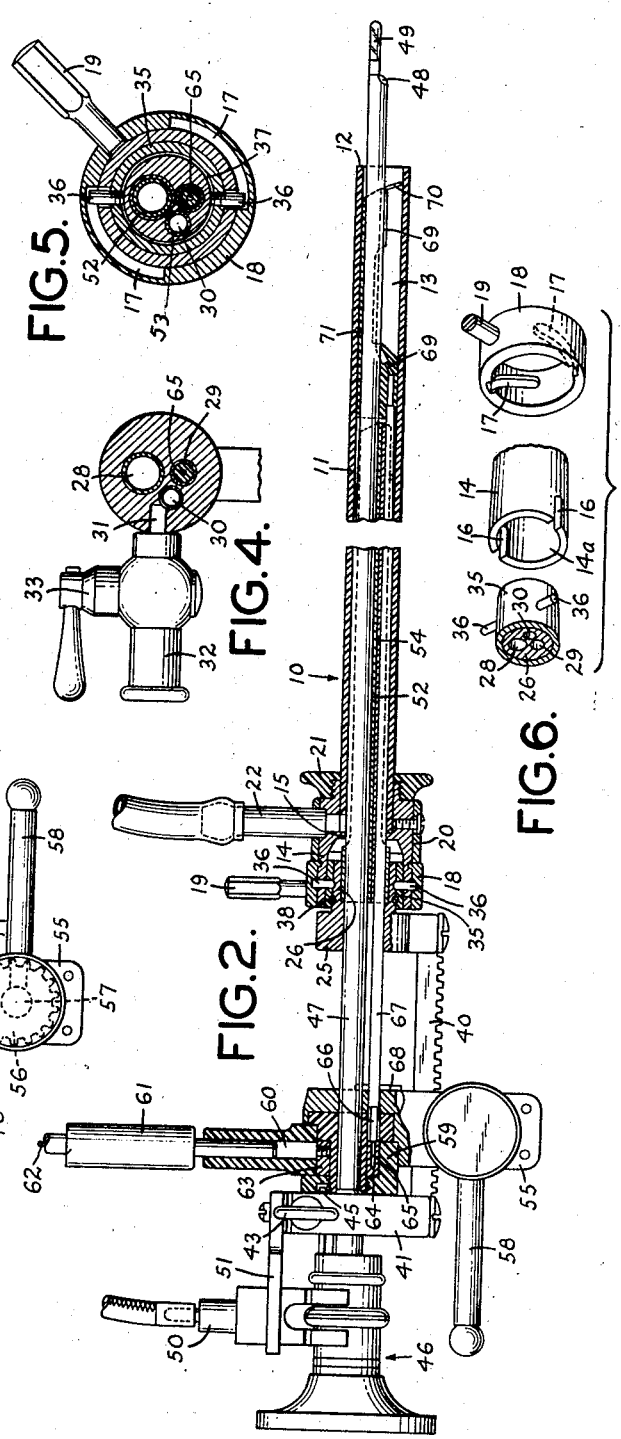

United States Patent Office 2,888,017
Patented May 26, 1959

2,888,017

ELECTROSURGICAL INSTRUMENT

Frederick Joseph Wallace, New York, N.Y., assignor to American Cystoscope Makers, Inc., New York, N.Y., a corporation of New York Application September 14, 1956, Serial No. 609,917

7 Claims. (Cl. 128—303.15)

This invention relates to an electrosurgical instrument and more particularly to such an instrument especially well adapted to endourethral surgery.

Electrosurgical instruments adapted for use in endourethral surgery have hitherto reached an advanced degree of development in providing a high frequency electric current operating electrode manually movable arcuately or longitudinally under conditions of illuminated vision. However such instruments have not facilitated free observation of the area undergoing examination or treatment throughout 360°. Furthermore, after being inserted into the body passageway portions of the instrument other than the working element thereof in contact with body tissue required manipulation. Among other things, this resulted, from time to time, in tissue requiring examination or treatment being obscured or overlooked due to the fact that such tissue would be engaged by the instrument and prevented from coming under observation or being treated.

While the present invention will be described in connection with an instrument particularly suited to endourethral surgery it will be evident that the principles thereof are applicable to other forms of surgery or treatment and in particular in the resection of protrusions and tumorous growths in body passages and cavities.

It is, therefore, a principal object of the present invention to provide an improved electrosurgical instrument especially well adapted for endourethral surgery and which facilitates to an enhanced degree observation of the body area requiring study and treatment while at the same time minimizing manipulation of the portions of the instrument in contact with body tissues.

Another object is to provide such an instrument which permits free rotation of the working element throughout 360° while the parts of the instrument in engagement with the tissue of the body remain immobilized.

Electrosurgical instruments for use in the examination and treatment of protrusions or tumorous growths in body passages and cavities conventionally include four major assemblies: (a) an elongated external sheath adapted to form a fenestra at its forward end while at its rearward end being adapted to be connected to (b) a working element having elongated guides adapted for insertion within the sheath and to receive (c) a telescope provided with illuminating means and (d) an electrode assembly. Heretofore, the forward end of the sheath terminated in an overhanging portion forming the top or hood of the fenestra below which the operating end of the electrode and the forward end of the telescope extended. The working element normally included a mechanical arrangement for manually advancing and withdrawing the electrode relative to its guideway and the sheath. Rotation of the electrode through an arc as well as rotation of the telescope objective and the light source associated therewith could be accomplished only by rotating the entire instrument including the sheath and the portion thereof forming the hood of the fenestra.

The present invention obviates the difficulties experienced in the past as it provides, among other things, a mounting between the sheath and the working element of the instrument which permits free rotation, throughout 360°, of the working element while the sheath remains immobilized. The sheath itself, an elongated tubular member, does not form the fenestra of the instrument. The forward end of the electrode is covered by an insulative shield defining an elongated passage through which the forward end of the optical system extends. With the electrode in its fully retracted position the operating end of the electrode as well as the insulative shield is fully withdrawn into the open end of the sheath leaving the relatively small diameter, objective end of the telescope and the light source entirely free for its intended use.

Further objects as well as advantages of the present invention will be apparent from the following description and the accompanying drawings in which—

Figure 1 is a side elevational view of an electro-surgical instrument constructed in accordance with the present invention and with the electrode in its fully forward or extended position, partially broken away for convenience;

Figure 2 is a longtiudinal cross-sectional view thereof;

Figure 3 is a transverse cross-sectional view thereof along the line 3—3 of Figure 1;

Figure 4 is a transverse cross-sectional view along lines 4—4 of Figure 1;

Figure 5 is a cross-sectional view along the line 5—5 of Figure 1;

Figure 6 is an exploded view, partially in section, of some of the parts shown in Figure 5; and Figure 7 is a right hand end view of the apparatus of Figure 1.

Referring now to the drawings in detail, the sheath assembly of electrosurgical instrument 10 comprises an elongated tubular member or endoscopic sheath 11 formed of Bakelite or other suitable material and terminating at its forward end 12 in a smoothly rounded end wall defining an axial opening forming the end of its internal passage 13. On its opposite or rearward end, sheath 11 is joined in liquid tight relation to an annular mounting member 14 provided with an annular land 15 the inner diameter of which is substantially equal to the inner diameter of sheath 11. Rearwardly of land 15, the inner surface 14a of mounting member 14 is tapered so that the cavity formed thereby has a diameter which decreases from left to right as viewed in Figure 2. A pair of opposed slots 16 are cut into the rearwardly presented end wall of mounting member 14 for coaction with a pair of opposed grooves 17 formed in an annular ring 18 rotatably mounted about the rear end portion of the mounting member and retained by means of annular sleeve 20. Ring 18 carries a handle 19 to facilitate manipulation thereof. A collar 21 is secured to the forward end portion of mounting member 14 and engirdles the portion of the sheath immediately adjacent the member 14. Mounting member 14 also carries an inlet conduit 22, the interior of which communicates with passage 13 through an opening formed adjacent the rearward end of sheath 11 for the transmission of an irrigating liquid through the interior of the sheath and into the body cavity.

The working element assembly comprises an annular block 25 having a portion 26 of reduced cross-section forming a forwardly presented extension thereof. Annular block 25 has two passages 28, 29 formed therethrough and a third, blind, passage 30 opening through the forward wall thereof and communicating with a cross-passage 31. An outlet conduit 32 is affixed to annular block 25 and communicates through cross-passage 31 with passage 30. Outlet conduit 32 is provided with a valve 33 for controlling the flow of fluid and may be utilized to control the quantity of fluid in the part of the body undergoing examination or treatment.

An externally tapered ring 35, generally frustro-conical in outline and complementary to the tapered seating surface formed in mounting member 14, engirdles mounting block portion 26 and is rotatably retained thereon by a pair of studs 36 which extend into an annular groove 37 (Figure 5) formed intermediate the ends of portion 26. Studs 36 are located 180° apart so that they may be received by slots 16 formed in mounting member 14 as will be more fully pointed out. An O-ring 38 seats in a recess provided in ring 35 and a registering groove formed about extension 26 to provide a fluid seal.

A rack 40 is secured adjacent to one end thereof to block 25 and adjacent to its other end to a support arm 41 provided with a clamp partially shown at 42 and a clamping screw 43 to receive and secure a mounting collar 44 and aligning pin 45 of surgical telescope 46. Telescope 46 comprises a tubular stem 47 which contains a lens system including an objective lens 48 (Figure 2) and a lens system (not shown) of any suitable type such as, for example, the lens system set forth in Patent Number 1,680,490 issued August 14, 1928. A miniature lamp 49 is positioned at the forward end of stem 47 electrical connection to which is made through suitable conventional devices including a terminal post 50 supported by bracket 51 which is in turn connected to arm 41. When mounted as shown in the drawings, telescope 46 is positioned with its stem 47 extending through passage 28 in mounting block 25 and along elongated guide sleeve 52, the latter being connected to block 25 with its passage in registration with passage 28. The forward end of the telescope including lamp 49 and objective lens 48 extends beyond the forward end of guide sleeve 52. At its rearward end, the telescope carries an eyepiece.

Also carried by the forwardly extending portion 26 of mounting block 25 is an elongated tube 53 which functions as a return conduit for irrigating liquid and a second guide sleeve 54, somewhat smaller in cross-section than sleeve 52, which serves to support and guide an electrode assembly to be described.

A housing 55 is slidably mounted on rack 40 and contains a pinion 56 in mesh with rack 40 and rotatable with a shaft 57 to which an operating crank 58 is connected. A block 59 of suitable insulating material is carried by housing 55 and accommodates a binding post 60 for receiving a suitable single-prong electric plug 61 adapted to be connected by lead 62 to a source, not shown, of high frequency "cutting" and "coagulating" currents. Binding post 60 is connected to a conductive core 63 provided with an opening 64 adapted to receive the end portion of electrode rod 65 forming part of the electrode assembly. Housing 55 and block 59 have passages formed therethrough in registration with one another and aligned to receive stem 47 so that housing 55 when displaced along rack 40, may slide along stem 47.

The electrode assembly comprises the aforementioned electrode rod 65 which is an elongated, solid, metallic, conductive member provided with an insulative covering 66 and extending through a tubular member 67, the latter being engaged by a releasable clamp 68 having an adjusting screw (not shown) when the exposed end portion of rod 65 is seated in core 63. The opposite or forward end of electrode rod 65 merges with a pair of forwardly and upwardly divergent conductive arms 69 coated with insulative material, one of which is shown in Figures 1 and 2, and terminating in a generally transverse uninsulated conductive operating electrode 70. Arms 69 are enclosed and bridged by an insulative insert 71 forming a fenestra 72 through which lamp 49 and telescope stem 47 extends. Electrode rod 65, being engaged with housing 55 through its engagement with core 63 and clamp 68, is reciprocated relative to sheath 11 when crank 58 is rotated to shift housing 55 along rack 40. As shown in Figure 1 the electrode assembly is almost fully extended to the right while in Figure 2 the parts are shown retracted thereby fully exposing lamp 49 and objective lens 48.

An outstanding feature of the present invention resides in the fact that annular block 25 and the appurtenances jointed thereto including the rack, housing 55, electrode assembly and telescope may be freely manipulated and rotated through a 360° arc while endoscopic sheath 11 engaging the walls of the passage of the patient's body remains motionless. Not only is manipulation of sheath 11 minimized but visualization of the entire undistorted lumen of the urethra and total scrutiny of the pendulous urethra for study or surgery is now possible.

With the parts assembled as shown, it is apparent that housing 55 may be advanced or retracted along rack 40 and, by reason of its connection thereto, the electrode assembly is similarly advanced and retracted. In its retracted position, the electrode loop 70 and insert 71 forming the fenestra are fully withdrawn into sheath 11 leaving lamp 49 and objective lens 48 exposed. Due to the rotatable coupling provided between annular block 25 and mounting member 14 by rotatable ring 35 both the telescope and the electrode assembly are freely rotatable throughout 360° while sheath 11 remains immobilized.

Rotation of handle 19 to its extreme counterclockwise position (Figure 5) serves to locate slots 17 so that the parts may be readily disassembled. Clockwise rotation of handle 19 serves to lock the parts together and due to the fact that slots 17 are inclined forwardly, the tapered external surface of ring 35 is fully seated in the matching recess provided in mounting member 14.

In carrying out a prostatic resection, it may be briefly noted that the instrument is introduced into the bladder with sheath 11 extending through the body passage of the patient. With the operating unit in place and retracted as shown in Figure 2 and without rotation or further manipulation of the sheath, block 25 may be rotated to permit free examination of the desired area throughout 360°. When it is desired to start the resection, crank 58 is rotated to properly position the electrode loop 70 which is then energized. During the resection, the bladder is distended by means of the liquid introduced through conduit 22 and with outlet valve 33 open over-distention is unlikely. Since the sheath is held in a fixed position and the operating unit is rotated within the sheath there is no distortion of the urethra nor are any tabs or portions of the prostate left in situ. It should also be noted that trauma is minimized through reduction of the need for manipulation of the sheath.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. An electrosurgical instrument, comprising an elongated endoscopic sheath having a forward and rearward end, releasable latching means on the rearward end of said sheath, an electrode rod reciprocable in said sheath between a forward and rearward position, said electrode rod extending in and rearwardly of said sheath and in its forward position extending beyond the forward end of said sheath, means adapted for connecting said electrode rod to a source of electric current, and mounting means supporting said electrode rod and adapted for reciprocating and rotating the same relative to said sheath, said mounting means including a member rotatably mounted relative to said electrode rod and in engagement with said latching means.

2. In an electrosurgical instrument, a mounting block having a forward and rearward end and an electrode passage formed therethrough, a rack connected to said mounting block and extending rearwardly thereof, a housing slidably mounted on said rack and reciprocable therealong, said housing being adapted to engage said electrode and connect the same to a source of electric current, and an annular member rotatably mounted about the forward end portion of said mounting block and adapted for releasable engagement with an endoscopic sheath, said mounting block being rotatable relative to said annular member substantially throughout 360°.

3. In an electrosurgical instrument, a mounting block having a forward and rearward end and an electrode passage formed therethrough, a rack connected to said mounting block and extending rearwardly thereof, a housing slidably mounted on said rack and reciprocable therealong, said housing being adapted to engage an electrode and connect the same to a source of electric current, an annular member rotatably mounted about the forward end portion of said mounting block, and a pair of locking studs extending outwardly from opposite sides of said annular member and adapted to connect said mounting block, with an electrode extended therethrough, to an endoscopic sheath, said mounting block being rotatable relative to said annular member substantially throughout 360°.

4. An electrosurgical instrument, comprising an elongated endoscopic sheath having a forward and rearward end, an electrode assembly including a conductive rod adapted to be connected to a source of electric current and having an operating loop at its forward end, mounting means supporting said electrode assembly and adapted for reciprocating said electrode assembly relative to said sheath between a forward and rearward position, a telescope assembly including a stem, an objective lens and a lamp adjacent to the forward end of said stem and means for connecting said lamp to a source of electric current, said mounting means supporting said telescope assembly with said stem extending through said sheath, means releasably connecting said mounting means to the rearward end of said sheath with said mounting means, electrode and telescope assemblies rotatable relative to said sheath, said last mentioned means including an annular rotatably mounted member, said electrode assembly in its rearward position being positioned with said loop removed from said lamp and objective lens and in its forward position being positioned with said loop adjacent to said lamp and in the field of view of said objective lens.

5. An electrosurgical instrument, comprising an elongated endoscopic sheath having a forward and rearward end, an electrode assembly including a conductive rod adapted to be connected to a source of electric current and having an operating loop at its forward end, an insulative member on said rod adjacent to said loop defining a passage having a fenestra adjacent to said loop, mounting means supporting said electrode assembly and adapted for reciprocating said electrode assembly relative to said sheath between a forward and rearward position, a telescope assembly including a stem and objective lens and a lamp adjacent to the forward end of said stem and means for connecting said lamp to a source of electric current, said mounting means supporting said telescope assembly with said stem extending through said sheath and in said passage, means releasably connecting said mounting means to the rearward end of said sheath with said mounting means rotatable relative to said sheath, and said electrode assembly in its rearward position being positioned with said insulative member and said loop within said sheath leaving said lamp and objective lens fully exposed and in its forward position being positioned with said loop adjacent said lamp and objective lens.

6. An electrosurgical instrument, comprising an elongated endoscopic sheath having a forward and rearward end, an annular mounting member joined to the rearward end portion of said sheath and having a pair of rearwardly opening slots formed therein, an annular member rotatably mounted on said mounting member and having a pair of forwardly inclined grooves formed therein for coaction with said slots, an electrode assembly including a conductive rod adapted to be connected to a source of electric current and having an operating loop at its forward end, an insulative member on said rod adjacent to said loop defining a passage having a fenestra adjacent to said loop, mounting means supporting said electrode assembly and adapted for reciprocating said electrode assembly relative to said sheath between a forward and rearward position, a telescope assembly including a stem, an objective lens and a lamp adjacent to the forward end of said stem and means for connecting said lamp to a source of electric current, said mounting means supporting said telescope assembly with said stem extending through said sheath and in said passage, said mounting means including a ring member rotatably mounted thereon, a pair of studs projecting from said ring member with each extending through one of said slots into one of said grooves, whereby said mounting means, telescope and electrode assemblies are rotatable relative to said sheath, and said electrode assembly in its rearward position being positioned with said insulative member and said loop within said sheath leaving said lamp and objective lens fully exposed and in its forward position being positioned with said loop adjacent said lamp and objective lens.

7. An electrosurgical instrument, comprising an elongated endoscopic sheath having a forward and rearward end, an annular mounting member joined to the rearward end position of said sheath and having an inner wall defining a tapered rearwardly opening cavity communicating forwardly with the interior of said sheath, said annular mounting member having a pair of rearwardly opening slots formed therein, an annular member engirdling said mounting member and having a pair of forwardly inclined grooves formed therein for coaction with said slots, said annular member being angularly displaceable about said mounting member for shifting said grooves along said slots, an electrode assembly including a conductive rod adapted to be connected to a source of electric current and having an operating loop at its forward end, an insulative member on said rod adjacent to said loop defining a passage having a fenestra adjacent to said loop, a mounting block having a forward and rearward end and a plurality of passages formed therethrough, a rack connected to said mounting block and extending rearwardly thereof, a housing slidably mounted on said rack and reciprocable therealong, said housing having a telescope passage formed therethrough and engaging and being adapted to connect said conductive rod to a source of electric current, a support arm connected to said rack rearwardly of said housing and having a telescope passage formed therethrough, a telescope assembly including a stem, an objective lens and a lamp adjacent to the forward end of said stem and means for connecting said lamp to a source of electric current, said telescope stem extending through said telescope passages and one of the passages in said mounting block and through said sheath, said electrode assembly being positioned with said conductive rod extending through another one of the passages in said block and along said sheath, a ring member rotatably mounted about said mounting block and having an external tapered surface for mating engagement with the inner wall of said mounting member, a pair of studs projecting from said ring member each releasably engaged in a corresponding pair of said slots and grooves, whereby said mounting block, telescope and electrode assemblies are rotatable relative to said sheath, and said electrode assembly in its rearward position being positioned with said insulative member and said loop within said sheath leaving said lamp and objective lens fully exposed and in its forward position being positioned with said loop adjacent said lamp and objective lens.

References Cited in the file of this patent

UNITED STATES PATENTS

| | | |
|---|---|---|
| 1,880,551 | Wappler | Oct. 4, 1932 |
| 1,963,636 | Wappler | June 19, 1934 |
| 2,038,393 | Wappler | Apr. 21, 1936 |